United States Patent
Klinke et al.

(10) Patent No.: US 7,120,246 B2
(45) Date of Patent: Oct. 10, 2006

(54) COMPUTER APPARATUS HAVING A MULTIWAY ACOUSTIC OUTPUT AND INPUT SYSTEM

(75) Inventors: Stefano Ambrosius Klinke, Düsseldorf (DE); Karl-Heinz Pflaum, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 337 days.

(21) Appl. No.: 10/221,898

(22) PCT Filed: Mar. 16, 2001

(86) PCT No.: PCT/DE01/01006

§ 371 (c)(1),
(2), (4) Date: Sep. 16, 2002

(87) PCT Pub. No.: WO01/69371

PCT Pub. Date: Sep. 20, 2001

(65) Prior Publication Data

US 2003/0104846 A1    Jun. 5, 2003

(30) Foreign Application Priority Data

Mar. 16, 2000 (DE) ................ 100 12 868

(51) Int. Cl.
*H04M 1/00* (2006.01)
(52) U.S. Cl. .................. 379/406.04; 379/406.03; 379/406.01
(58) Field of Classification Search ........... 379/406.01, 379/406.03, 406.04
See application file for complete search history.

(56) References Cited

U.S. PATENT DOCUMENTS 6,700,978 B1 * 3/2004 Bershad et al. ........ 379/406.08

FOREIGN PATENT DOCUMENTS

EP        0836360      4/1998
WO       WO 99/09730   2/1999

* cited by examiner

*Primary Examiner*—Jefferey F. Harold
(74) *Attorney, Agent, or Firm*—Bell, Boyd & Lloyd LLC

(57) ABSTRACT

A computer apparatus is provided, which has a multipath acoustic output system and a multipath acoustic input system, which includes parts for enabling an adaptation of the filter of an acoustic echo canceller incorporated in the computer apparatus that is always precise regardless of the chronological delays of the components of the computer apparatus, wherein the chronological delays are variable for acoustic signals.

3 Claims, 2 Drawing Sheets

COMPUTER APPARATUS HAVING A MULTIWAY ACOUSTIC OUTPUT AND INPUT SYSTEM

Figure 1:
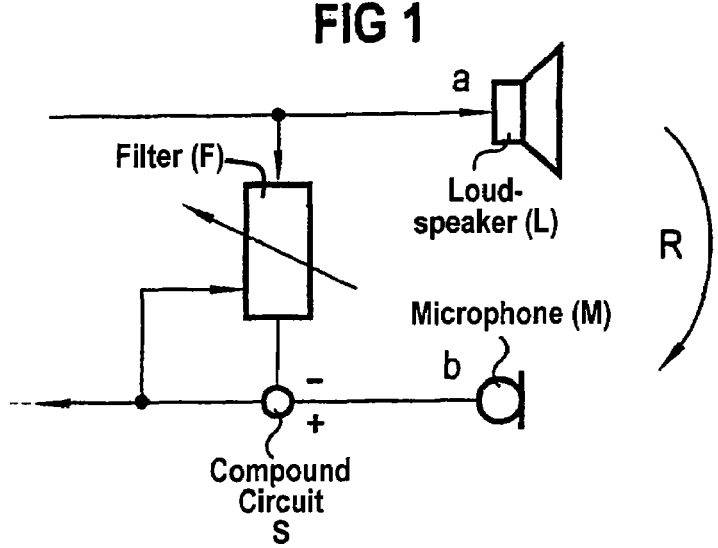

The invention is directed to a computer appliance having a multipath acoustic output and input system according to the preamble of claim 1.

For example, telephone devices have means for eliminating acoustic echo signals [ . . . ] known as acoustic echo elimination circuits and also referred to as Acoustic Echo Canceller (AEC) which are coupled, by the receiver of the telephone device, through the space into the speaking piece. [sic] The acoustic echo canceller is particularly important when speech is uttered without holding an acoustic input device to the ear and mouth.

An adaptive filter is a crucial component of the acoustic echo canceller. The adaptive filter reproduces the transmission function of the space. On one hand, the acoustic echo canceller receives, as a reference signal, the output signal which is guided to the loudspeaker and, on the other hand, receives the input signal which is led into the system by the microphone. Therefore, the output signal follows two separate paths. One time, it is directly applied and, another time, it is guided via the loudspeaker through the space and the microphone. If the filter is adapted effectively, both paths are equivalent. The two paths are equivalent since the adaptive filter precisely reproduces the path of the output signal via the loudspeaker, the space and the microphone given an effective adaptation. Therefore, the difference of the two signals is at least almost zero. The suppression of the echo is thus achieved.

The echo can only be suppressed when the signal reaching the loudspeaker and the signal accepted by the microphone correlate in terms of time. In this context, a chronological correlation means that only a constant delay is present between the two relevant signals. In addition to the generally known telephone devices, ever more computer appliances, such as personal computers, are used for telephoning. As mentioned above, it is particularly important that an effective adaptation of the adaptive filter of the acoustic echo canceller is present since the signal of the remote speaker can have an unimpeded effect on the microphone given handsfree talking. Different from telephone devices, a computer appliance has the disadvantage that the means for providing acoustic signals to be outputted and the means for processing received acoustic signals do not exhibit a constant delay over the course of time. For different reasons caused by the operating system of the computer appliance, the delays are not constant with respect to the distance via the loudspeaker, the space and the microphone. The signals arriving at the acoustic echo canceller, i.e., the signal which is outputted via the loudspeaker and the signal which is accepted by the microphone, do not chronologically correlate with one another. Therefore, a onetime adjusted adaptation of the adaptive acoustic echo canceller is not sufficient in order to always suppress the echo.

On the basis of a computer appliance of the aforementioned type, an object of the invention is to provide technical measures which enable an adaptation of the filter of the acoustic echo canceller that is always precise regardless of the chronological delays of the components of the computer appliance, whereby said chronological delays are variable for acoustic signals.

This object is inventively achieved by the features of the characterizing part of claim 1.

Due to these features, the acoustic signals at the adaptive filter of the acoustic echo canceller, namely the acoustic signal for the receiver or, respectively, loudspeaker of the computer appliance and the acoustic signal accepted by the microphone, are independent of occurring variations given the chronological delays of the components for the acoustic signals always chronologically correlate with one another. [sic]

Advantageous embodiments of the invention are subject matter of sublaims.

The invention is subsequently explained in greater detail on the basis of a drawing.

Figure 2:
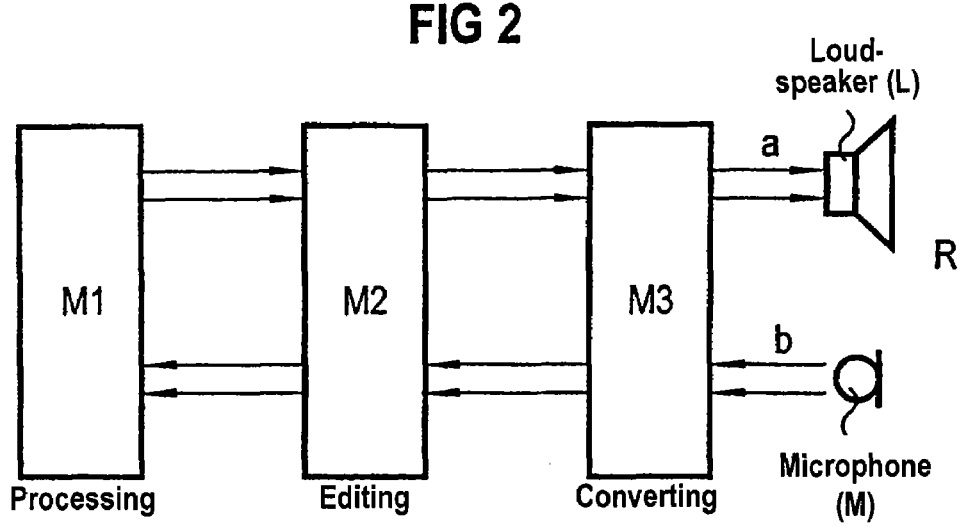
Figure 3:
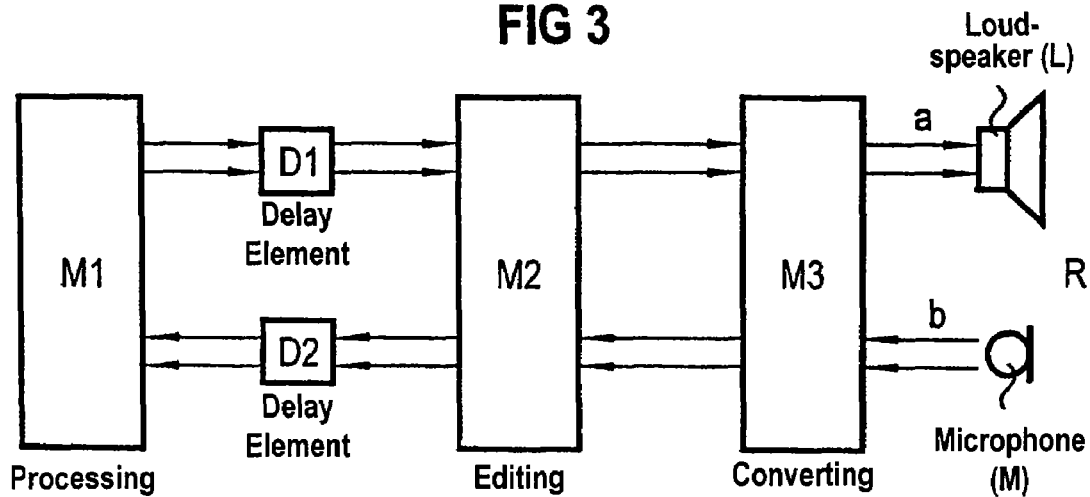
Figure 4:
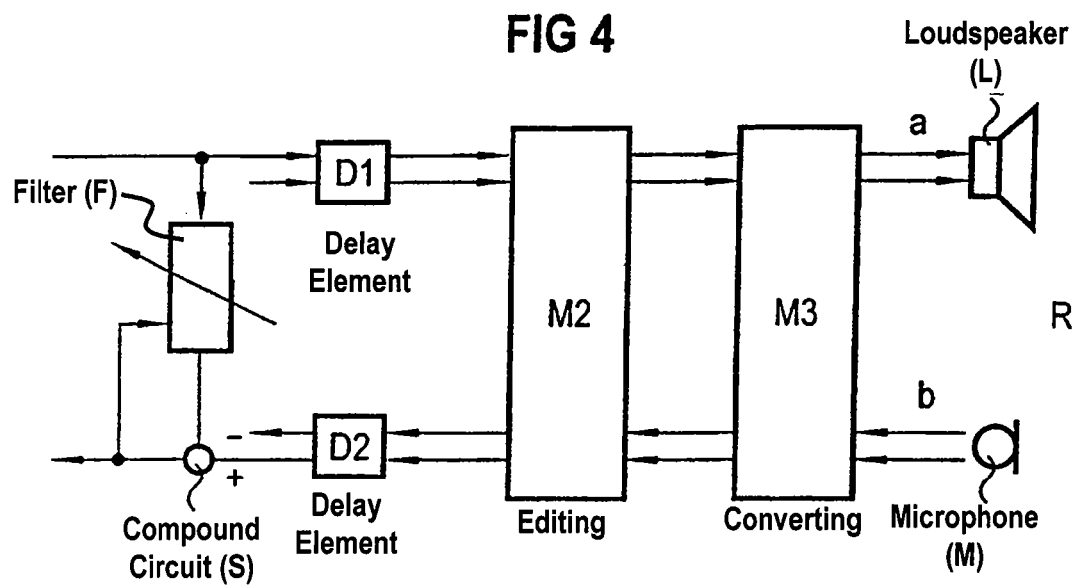
Figure 5:
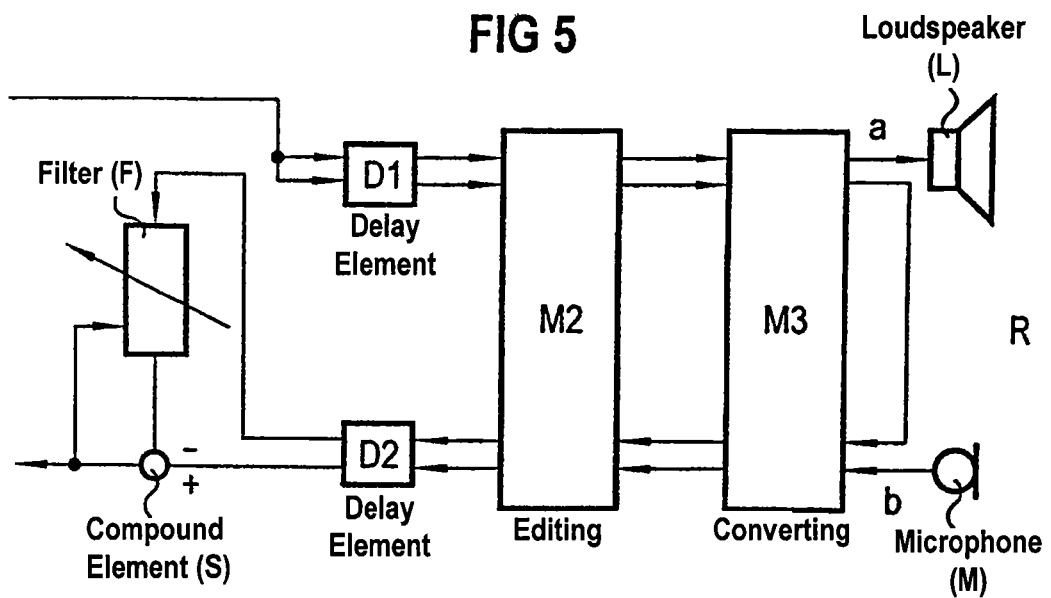

FIG. 1 shows a basic termination circuit of a filter of an acoustic echo canceller in a telephone arrangement according to the prior art, FIG. 2 shows a basic operational diagram of the output and input of acoustic signals in a computer appliance according to the prior art, FIG. 3 shows an operational diagram according to FIG. 3 with delay elements added in a basic manner, FIG. 4 shows an operational diagram according to FIG. 4 with a detailed representation of an acoustic echo canceller according to FIG. 1, and FIG. 5 shows a basic operational diagram of the output and input of acoustic signals in a computer appliance according to the invention.

The same elements have the same reference characters in the Figures.

FIG. 1. schematically shows an acoustic echo canceller whose core is an adaptive filter F. An acoustic signal to be outputted, as an analog electrical signal in the present case, is guided, via a line a, to an input of the filter F and to a loudspeaker L. The loudspeaker L transforms the analog electrical signal into an acoustic signal and said signal is radiated into a space R. A microphone M receives the acoustic signal and transforms it into an electrical analog signal. The analog signal, via a line b, is guided to a positive input of a compound circuit S. An output signal of the filter F is led to a negative input of the compound circuit S. For readjusting purposes, a result signal of the compound circuit S is led to a feedback input of the filter F.

The filter F is adjusted such that it balances the delay circuit for a signal—which travels the distance from the line a via the loudspeaker L, the space R, the microphone M and the line b—to the extent that the signal at the input of the filter F arrives at the same time at the compound circuit S as the signal led via said path. In this way, an echo can be suppressed.

The system shown in FIG. 1 only has a constant delay, so that the signals on the lines a and b are chronologically correlated.

In a complex system, such as a personal computer, the output and input of audio signals occurs differently. FIG. 2 shows the part of a personal computer which is crucial for an output and input of audio signals. This part has first means M1 for digitally processing acoustic signals to be outputted or, respectively, acoustic signals that have been received. Furthermore, this part has second means M2 for editing purposes for forwarding acoustic data provided by the first means M1 for an output or, respectively, for editing purposes for a forwarding to the first means M1 of the received acoustic data. [sic] Finally, this part has third means M3 for converting the acoustic data, which are edited by the second means M2 for the transfer, into analog acoustic signals and for acoustically outputting the converted analog acoustic signals via lines a and the loudspeaker L in this case. The third means M3 are also used for the conversion for the second means M2 into digital acoustic data of analog acoustic signals accepted via the microphone M and via lines b in the present case. [sic]

In the concrete case, the first means M1 are at least partially formed by program control elements of the computer appliance that is relevant in FIG. 2. The second means are formed by what are referred to as drivers which are necessary for operating specific device parts of a computer appliance. The third means M3 imitate a what is referred to as sound card. The sound card, in the one direction, converts digital signals into analog signals and, in the other direction, converts analog signals into digital signals.

The loudspeaker L and the microphone are acoustic converters. In this sense, the loudspeaker L represents a first acoustic converter and the microphone M represents a second acoustic converter, for example.

The circumstance that the arrangement of FIG. 2 has a number of paths to the loudspeaker or, respectively, a number of paths from the microphone indicates that an output or, respectively, an acceptance of audio signals or, respectively, acoustic signals can occur separately from one another on a number of channels, as this is the case with respect to stereo transmissions, for example. In this case, at least one further loudspeaker L or, respectively, one further microphone M are provided.

In the present case, a stereo transmission or, respectively, a stereo acceptance is not realized. Therefore, respectively one line a or, respectively, b is basically redundant for the output and also for the acceptance of audio signals.

The transmission of signals from the first means M1 to the second means M2 and from the second means M2 to the third means M3 or, respectively, from the third means M3 to the second means M2 and from the second means M2 to the first means M1 is respectively critical. This transmission is not possible without delays. The sizes [or: lengths] of the delays, among other things, are determined by the operating system or, respectively, by the current situation of the operating system.

Therefore, FIG. 3 shows the system of FIG. 2 with delay elements D1, D2. The delays shown by the delay elements D1, D2 are not constant, as it has been indicated above. As a result, the signals at the loudspeaker L and at the microphone M do not correlate in terms of time. Therefore, an acoustic echo canceller (see FIG. 4) formed by parts of the first means M1, at least, does not function satisfactorily.

This problem is solved by a connection of the present parts according to FIG. 5. At least one of the output multipaths is connected to at least one of the input multipaths. In the present case, they are even short-circuited. Furthermore, the means of the first means M1, which reproduce an acoustic echo canceller, are connected such that they, on the input side, have a connection with one of the input multipaths which has an executed connection with one of the output multipaths. Furthermore, these means are connected such that they, at the output side, have a connection with an input multipath which has a connection to a microphone M.

The acoustic echo canceller thus "reads" the channels of the sound card, whereby the signal of at least one microphone is situated in at least one of the channels and the reference signals therefor. This signal is the same signal which has also reached the loudspeaker. It is chronologically correlated with the signal of the microphone since the echo through the space (signal at the microphone) and the reference signal for the filter traveled the same path through the sound card.

Although the delays symbolized by the delay elements D1, D2 change, the echo signal and the reference signal for the filter always remain chronologically correlated in this way. It is thus possible to realize an acoustic echo canceller in a personal computer.

If the sound card is fashioned such that it has at least one further audio output and audio input, which is not used for the audio output or, respectively, input, in addition to one or more audio outputs or, respectively, audio inputs, which are used for the audio output or, respectively, audio input, an acoustic echo canceller can be successfully used in the personal computer although a number of channels are used in a personal computer for the audio output or, respectively, audio input.

The invention claimed is:

1. A computer apparatus having a multipath acoustic output system and a multipath acoustic input system, comprising:

first parts for digitally processing one of acoustic data to be outputted and received acoustic data;

second parts for editing and forwarding the acoustic data provided by the first parts to an output and forwarding to the first parts the received acoustic data; and third parts for, respectively, converting the edited acoustic signals into analog acoustic signals, and for acoustically outputting the converted analog acoustic signals via at least one single line of the output multipaths and by at least one single first acoustic converter, and converting, for the second parts, into digital acoustic data, via at least one single line of the input multipaths, the analog acoustic signals accepted by at least one single second acoustic converter;

wherein at least one of the output multipaths is connected to at least one of the input multipaths, with the first parts reproducing an acoustic echo elimination circuit which, on the input side, is connected to the input multipath which is connected to an output multipath and, on the output side, is connected to an input multipath that is connected to the second acoustic converter, and wherein at least one connection between an output multipath and an input multipath is a short-circuit connection.

2. A computer apparatus having a multipath acoustic output system and a multipath acoustic input system as claimed in claim 1, wherein the first parts include elements of a program control, the second parts perform driver functions and the third parts perform sound card functions.

3. A computer apparatus having a multipath acoustic output system and a multipath acoustic input system as claimed in claim 1, wherein the first acoustic converters are loudspeakers and the second acoustic converters are microphones.

* * * * *